United States Patent

Wolfson

Patent Number: 5,305,171
Date of Patent: Apr. 19, 1994

[54] TAPE CASSETTE SPEED-RELEASE CLUTCH

[76] Inventor: Alfred J. Wolfson, 325 E. 21st St., #13, New York, N.Y. 10010

[21] Appl. No.: 802,616

[22] Filed: Dec. 5, 1991

Related U.S. Application Data

[63] Continuation-in-part of Ser. No. 611,838, Nov. 13, 1990, abandoned.

[51] Int. Cl.$^5$ .............................................. G11B 23/08
[52] U.S. Cl. ...................................... 360/132; 242/199
[58] Field of Search ................ 360/132; 242/193, 194, 242/197, 199, 200; 192/103 R, 103 A, 103 B, 104 R, 106 R

[56] References Cited

U.S. PATENT DOCUMENTS

| | | | |
|---|---|---|---|
| 1,745,738 | 2/1930 | Carter | 192/103 B |
| 4,406,426 | 9/1983 | Crandall | 242/197 |
| 4,512,535 | 4/1985 | Dickson | 242/200 |
| 4,632,335 | 12/1986 | Dickson | 242/200 |
| 4,928,905 | 5/1990 | Granzotto et al. | 242/200 |
| 5,005,099 | 4/1991 | Perryman et al. | 360/132 |

Primary Examiner—Robert S. Tupper
Assistant Examiner—Paul J. Ditmyer
Attorney, Agent, or Firm—Richard C. Litman

[57] ABSTRACT

A video tape cassette includes in one reel of the cassette a one-way, speed-release clutch. The clutch allows the tape, when inserted into a recording machine, to be moved in a forward direction at recording or playback speed, but not to be moved at "fast forward" speed. This prevents cassette users from skipping over parts of the recording, such as advertisements. Reverse motion of the tape is not affected. The clutch may be of any sort which releases or locks at high rotation rates; one embodiment includes a swinging arm which at high speeds is held out of engagement by centrifugal force thus freeing a tape reel, and at low speeds pushes on a pin to drive the reel. Another embodiment includes a swinging arm which at high speeds is swung into engagement with a stop pin thus locking the tape reel, and at low speeds does not engage the stop pin.

8 Claims, 4 Drawing Sheets

TAPE CASSETTE SPEED-RELEASE CLUTCH

CROSS REFERENCE TO RELATED APPLICATION

This application is a continuation-in-part of application Ser. No. 07/611,838 filed Nov. 13, 1990, now abandoned.

FIELD OF THE INVENTION

The present invention relates to cassettes, such as magnetic video tape cassettes, which incorporate internal motion controls to limit use of the cassettes.

DESCRIPTION OF THE PRIOR ART

Typically, magnetic tape cassettes consist of a plastic housing, tape, and two reels. The tape is fastened at either end to a respective reel. The reels are adapted to be turned by external capstans which can intrude through openings in the housing to engage the reels.

There are usually several modes of tape transfer available in the playing/recording machine or "recorder" into which the tape cassette is put. To pass the tape over the playing heads of the recorder machine in the playback and record modes, the tape is moved forward by rollers which grip the tape; in the rewind mode the tape is quickly moved backward; and in the fast forward mode the tape is moved quickly forward. These motions all require that the two capstans produce certain motions and forces on their respective reels.

To prevent the tape from bunching, tearing, and so on during and between these different modes of tape motion, many ingenious and complex mechanisms have evolved, all connected to the capstans and tape rollers. The tape cassette itself is a mere passive workpiece to these mechanisms of the recorder; the cassette contains no parts which affect the tape motion, or change it from that motion imparted by the recorder.

The three main modes of tape motion mentioned above allow a recorder user to control the playback of the recorded material. In particular, a user can "skip over" sections of the recording which he or she dislikes, such as advertisements, by fast forwarding.

This practice is especially common in video recording playback, where advertisements may be included along with a recorded movie. Users often fast forward over the advertisements. This practice decreases the value of the advertising, as it is known to advertisers that the practice is common, and the advertisers are willing to pay less for advertisements embedded in a video movie.

Thus, if users were unable to fast forward and thereby avoid watching the advertisements, such advertising would increase in value. Recorders without fast forward would solve the problem, but people would not but such a recorder. The only other way to prevent fast forward mode is by making the cassettes themselves incapable of fast forwarding when used in the usual recorder which has a fast forward tape motion mode.

The prior art reveals several modifications of the standard cassette to prevent certain tape motion modes.

Dickson et al., in U.S. Pat. No. 4,512,535, teaches the use of a cassette having one reel engaging its drive capstan through a one-way clutch mounted in the tape reel. The one-way clutch permits the tape to move in the forward direction, as in play mode and fast forward mode, but prevents rewinding of the tape. The tape can only be rewound with a key, kept at the video rental store. The Dickson cassette is intended to prevent video tape renters from watching a movie twice without paying the video store twice.

Dickson et al. achieve their goal by a roller clutch built directly into reel. Rollers are trapped between a cylindrical housing and a series of ramps. In one sense of rotation, the rollers are wedged between the ramps and housing; in the opposite sense they roll "down" the ramp and are not wedged. Such one-way clutches are common on many machines, e.g., lawn mower engine pull rope starters.

Each roller has a circumferential groove which will slip over a ring on the interior of the housing, if that roller is moved in a longitudinal direction to a point where the ring and groove are aligned. The roller will not wedge there. To disable the clutch and allow rewinding, the rollers are elevated to their various respective alignment positions by a key. The key has posts of various length which insert through holes disposed below each roller, and push that roller up to its alignment position.

A later invention of Dickson et al., shown in U.S. Pat. No. 4,632,335 is based on the same general principle as that of U.S. Pat. No. 4,512,535. A one-way roller clutch is used again; instead of a key the invention uses a special rewinding machine and a computer. Rewinding can only be done with the special machine.

Crandall, in U.S. Pat. No. 4,406,426, discloses keyed cassettes and a method of making them. To play the cassette one must have the drive key. Having the key, the tape may be moved either forward or backward at will in a recorder. The Crandall device is intended for information security with all sorts of cassette tapes. U.S. Pat. No. 5,005,099, issued to James D. Perryman et al on Apr. 2, 1991, describes several methods and related apparatus for the prevention of the fast-forwarding of a video cassette tape. One method employs an electrical current generator adapted to be driven by one of the tape reels. The generator is in electrical communication with an auxiliary light source capable of actuating the photoelectric stop circuitry of many cassette recorders. To prevent fast-forward operation of the recorder, the voltage developed by the generator is selected such that it will be sufficient to activate the auxiliary light source only when driven at fast-forward speed.

None of the above inventions and patents, taken either singly or in combination, is seen to describe the instant invention as claimed.

Neither are any of the above seen to teach a way of preventing users from fast forwarding a cassette tape in a recorder machine having a fast forward mode through the addition of a clutch mechanism in a reel assembly of a tape cassette.

Accordingly, one object of the present invention is a video tape cassette which permits, in the forward direction, only play speed and not fast forward speed.

Another object of the present invention is a cassette which encourages the watching of advertisements on a video tape.

Still another object of the present invention is a cassette which stops the tape upon engaging fast forward.

These and other objects of the present invention will become readily apparent upon further review of the following specification and drawings.

SUMMARY OF THE INVENTION

The present invention is a video tape cassette which includes in one reel of the cassette a one-way, speed-release clutch interposed between the reel and the drive capstan of a recording machine. The clutch allows the tape, when inserted into a recording machine, to be moved in a forward direction at recording or playback speed, but not to be moved at high fast forward speed. Reverse motion of the tape is not affected.

This prevents cassette users from skipping over parts of the recording, such as advertisements. Advertising on such a cassette is more valuable, as it is more likely to be watched.

The clutch may be of any sort which releases at high rotation rates. The preferred embodiment includes a swinging arm which at high speeds is held out of contact from an output drive stud output by centrifugal force, and at low speeds drags on that stud with sufficient force to drive the reel.

The clutch is mounted on the reel which is the takeup reel in the forward modes of playback and fast forward.

BRIEF DESCRIPTION OF THE DRAWINGS

Similar reference characters denote corresponding features consistently throughout the attached drawings.

DETAILED DESCRIPTION OF THE PREFERRED EMBODIMENTS

The present invention is a video tape cassette, one of whose reels contains a speed-sensitive clutch. The clutch is designed to disengage at high speeds when the tape is moving in the forward (play and fast forward) direction. The clutch is mounted on the reel which is the takeup reel in the forward modes of playback and fast forward.

Figure 1:
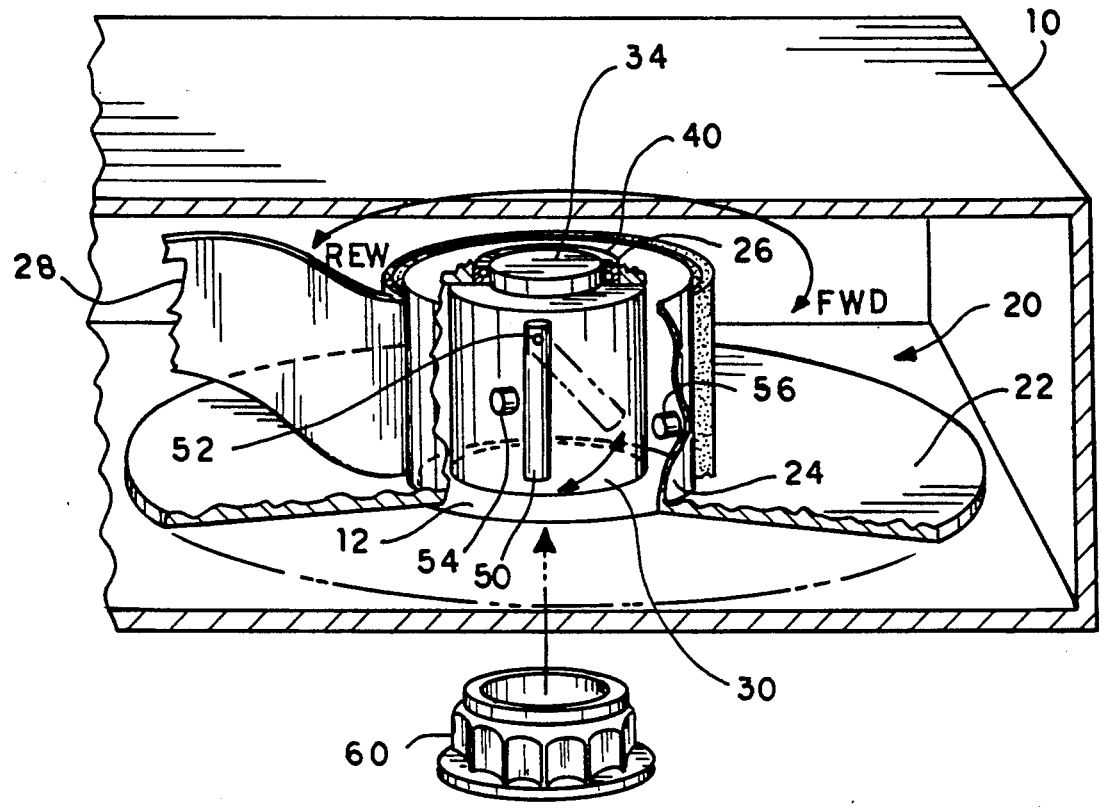
FIG. 1 is a partial cutaway perspective view showing a part of the cassette housing, the clutched reel, the clutch mechanism, and the capstan of a recorder in a first embodiment of the invention.
Figure 2:
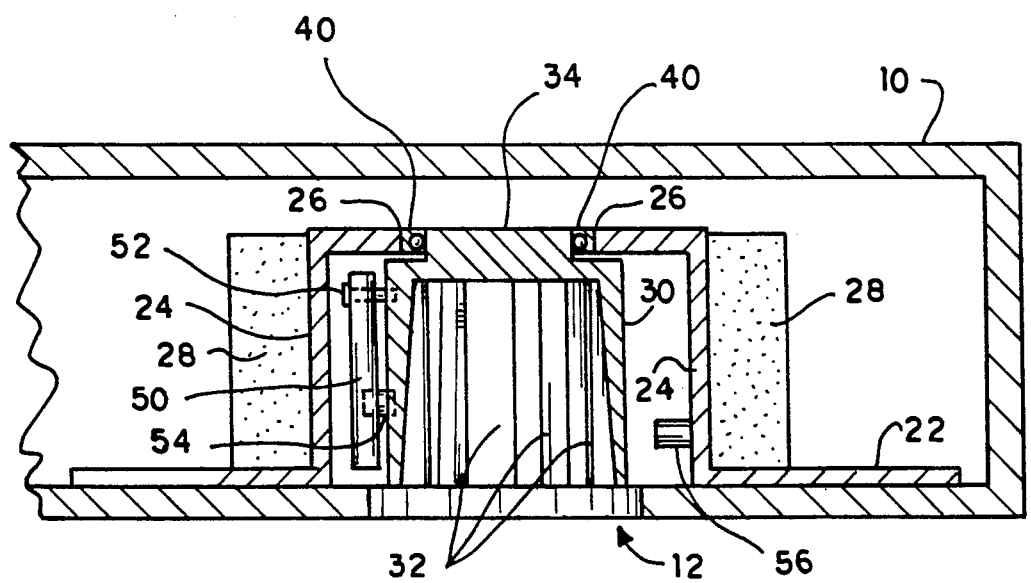
FIG. 2 is a cross sectional view of the housing, reel, and clutch in the first embodiment of the invention.
Figure 3:
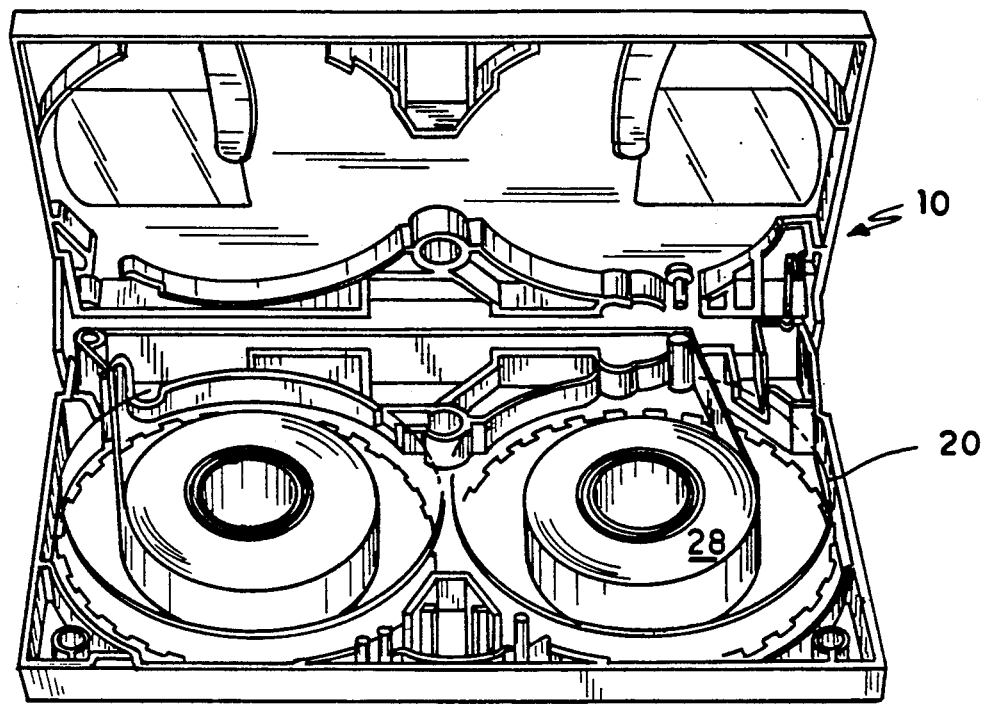
FIG. 3 is a typical prior art cassette mechanism with the housing tilted upward to expose the tape reels.

A first embodiment of the invention will first be described in reference to FIGS. 1 and 2. Referring to FIG. 1, a cassette housing 10 is shown sectioned to reveal the invention.

Disposed within the housing 10 is a radially symmetric tape reel or spool 20. The reel includes a lower disc or plate 22 and a cylindrical sleeve 24, with an annulus above. The annulus surrounds an opening having a circular edge 26. Tape 28 is wrapped about the sleeve 24.

In shape, the reel 20 resembles a straw hat or a top hat with an opening in the center of the crown.

A hole 12 in the housing 10 is below and generally concentric with the reel 20. The hole is to admit a drive capstan 60 of the recorder into which the cassette is placed for playback. The capstan is not an element of the instant invention.

Upon insertion through the hole 12 the drive capstan 60 enters and engages the spindle 30. The drive capstan and the spindle are then rotationally locked by means of the internal (female) splines 32 of the spindle 30 which mate with complementary external (male) splines on the drive capstan 60. The internal splines 32 are shown in FIG. 2.

Referring again to FIG. 1, the spindle 30 includes a short shaft 34 extending from its top surface, concentric with the inserted capstan and spindle splines. The inner race of a ball bearing 40 is press-fit onto the shaft 34.

The outer race of the bearing 40 is press-fit into the opening edge 26 of the reel 20. Thus the spindle 30 and reel 20 are free to relatively rotate about the vertical axis of the bearing 40.

The freedom of rotation is modified by the clutch mechanism disposed within the cylindrical space between the inside of the sleeve 24 and the outside of the spindle 30. The clutch comprises an arm 50, a pivot shaft 52, a stop pin 54, and a drive stud 56.

The arm 50 is free to rotate about the pivot shaft 52. When the spindle 30 is at rest, the arm 50 hangs down as shown in FIG. 1. The arm 50 cannot rotate clockwise (as shown in FIG. 1) from this position because the arm hits the stop pin 54. In the counter-clockwise direction, the arm 50 is relatively, but not completely, free to rotate. The arm is of such a length and disposition that it will contact the drive stud 56 upon relative rotation of the spindle 30 and reel 20.

The clutch operates differently for different directions or senses of rotation, corresponding to the two directions of tape travel past the playing head: forward (play, record and fast forward modes of recorder operation) and reverse (rewind mode).

In the reverse direction or rewind mode, arrow labeled REW in FIG. 1, the clutched reel of the present invention acts as does an ordinary reel. In other words, the reel 20 and inner spindle 30 are locked together and turn as one unit. In FIG. 1, this mode would be a counter-clockwise rotation of the reel 20 when looking down on the reel. The arm 50 will move (to the right in FIG. 1, out of the paper in FIG. 2) and come into contact with the drive stud 56. The arm will be unable to rotate out of the way of the stud because of the stop pin 54, and the reel 20 will be turned. Thus a rotation of the spindle in this sense will cause the clutch to lock.

In the forward direction, arrow labeled FWD in FIG. 1, the arm 50 will move (to the left in FIG. 1, into the paper in FIG. 2) and again come into contact with the drive stud 56. The stop pin 54 is now on the wrong side of the arm 50 to absolutely prevent it from rotating as in the reverse direction above.

However, in the forward direction, the weight of the arm 50 plus the turning resistance at pivot pin will hold the arm down just enough so as to allow it to drive the stud 56 around at the low forward speeds characteristic of the playback or record modes. There is little friction to be dealt with in this mode of recorder operation, because the tape 28 is fed past the playback heads by a system of rollers in the recorder (not shown). The drive arm 50 needs to overcome naught but the little friction involved in turning the reel 20 to take up slack in the tape as it emerges from the drive rollers, not that of pulling or winding the tape. Thus the clutch can transmit the needed torque for play mode by the mere weight of swinging arm 50 resting frictionally against drive stud 56, and is thus engaged, albeit weakly, sufficiently for the torque on the takeup reel in the play mode.

If the recorder is switched to fast forward speed, the arm 50 must overcome not only the greater friction of turning the reel 20 at a higher speed, but it must also transmit the torque needed to pull the tape 28 off the other reel and past rollers. Added to this extra torque requirement is the inertia of the reel 20 which must be sped up when changing to the fast forward speed. The greater resistance to motion of the reel 20, acting through the drive stud 56, will cause the arm 50 to slip on the drive stud 56 and rotate about the pivot shaft 52, causing the arm's lower end to ride up and over the drive stud 56. It is to be noted that the actual value of this "breakout" torque may be controlled by adjusting such factors as the turning resistance at pivot shaft 52, the weight of arm 50, and the roughness or coefficient of friction between shaft 52 and arm 50. It is contemplated that the turning resistance at shaft 52 may be augmented by simple spring devices, etc.

Now free and driven by the full force of the capstan 60 (which is striving to drive both reels at high speed) the spindle 30 will experience a high angular acceleration. The arm 50 will tend to be thrown to a higher angle by this acceleration. Moreover, should arm 50 again encounter the drive stud 56 (after a full revolution) it will strike it at high speed with glancing impact, causing the arm to rotate upward still more. One skilled in the art will recognize that as arm 50 is rotated upward about pivot shaft 52 its center of gravity is moved further away from the overall rotation axis of spindle 30. This increased radial distance combined with the increased angular velocity of spindle 30 serve to significantly increase the centrifugal force on arm 50.

Once the arm is out of its vertical position, the much greater centrifugal force on the arm will exert a moment tending to bind the arm about the axis of the pivot shaft 52. Then centrifugal force will keep the arm elevated. The clutch is disengaged. Further spinning of the spindle 30 will occur freely but will be ineffective to pull the tape past the point where breaking loose occurred.

The clutch will not reengage unless the rotation of the spindle 30 slows, reducing the centrifugal force and allowing the arm 50 to drop. This will happen when the user of the recorder switches the machine from fast forward back to play, whereupon the user is presented with an advertisement in spite of his efforts to skip it with the fast forward control.

In the first embodiment so far described the fast forwarding is prevented by the cassette element being clutched in such a manner as to prevent sufficient torque to be applied to the tape reels to effect the fast forwarding. Instead the reel pulling the tape is simply released from its drive motor and the motor rotates freely.

Figure 4:
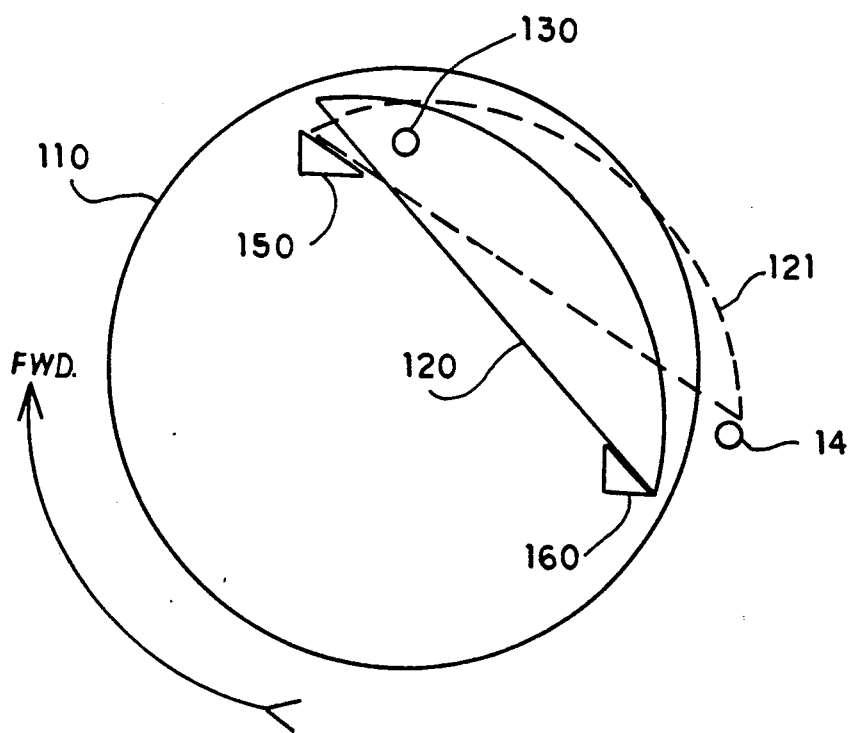
FIG. 4 is a top view of a second embodiment of a clutch mechanism of the invention.

A second embodiment will now be described with reference to FIGS. 4 through 7. This embodiment differs from the first described in that the tape pulling reel in the fast forward mode is not cut loose from its drive means but is instead caused to jam against a fixed catch thus stopping its rotation entirely. FIG. 4 shows the mechanism as seen from the top looking down on a reel such as reel 20 of FIG. 1. Circular mounting plate 110 is adapted to be firmly attached to the top surface of a conventional tape spool and is thus constrained to rotate with it about the same axis and at the same angular velocity. Pivoted to plate 110 at pin means 130 is a flat arcuate wedge arm 120. The rotation extents of wedge arm 120 about pin means 130 are limited by deployment stop 150 and rest stop 160. In the stopped or slowly rotating position arm 120 rests against stop 160. It is contemplated that this rest position could be maintained by a rather weak spring means incorporated into pivot means 130 and shown schematically as element 170 in FIG. 5. The direction of forward tape motion is indicated by the arrow labeled FWD in FIG. 4. The only other element required in this embodiment is catch pin 140 which is rigidly mounted to the cassette housing 10 (See FIG. 1) just beyond the outside circumference of circular mounting plate 110. If the angular velocity of the spool 20 (and thus mounting plate 110) is increased to a predetermined value the wedge arm 120 will be swung outwardly by centrifugal force to the dashed line position shown. In this outwardly swung position tip 121 of wedge arm 120 will engage catch pin 140. This will in turn tend to swing wedge arm 120 outward even further (counterclockwise in FIG. 4) until contact is made with deployment stop 150. At this point the entire mechanism is locked up positively preventing further rotation of mounting plate 110 and attached tape spool 20.

Figure 6A:
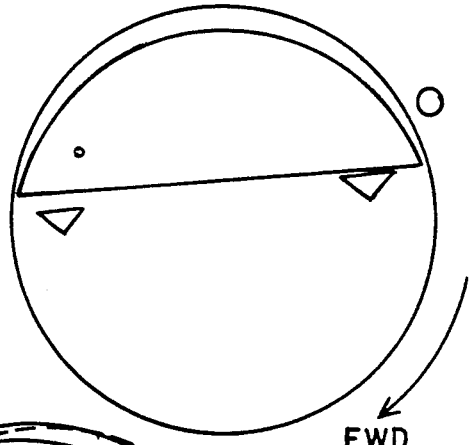
FIGS. 6A, 6B, and 6C show the clutch mechanism of FIG. 4 in the play, fast forward, and rewind modes respectively.
Figure 6B:
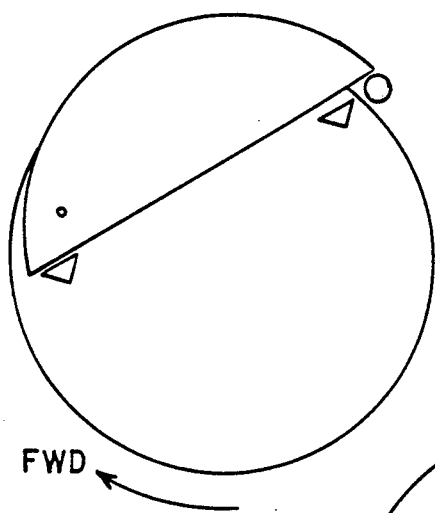
Figure 6C:
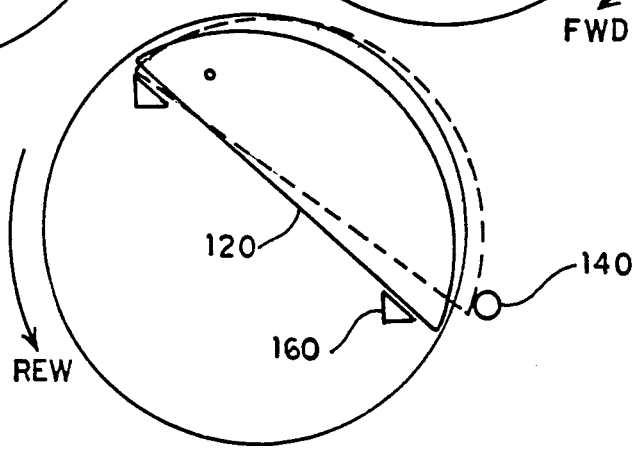

In the reverse or rewind direction tip 121 of arm 120 will also swing outward at sufficiently high angular velocities and contact catch pin 140 (see FIG. 6C). However in this direction arm 120 will harmlessly pivot back against rest stop 160 and do nothing to interfere with the normal rewinding action.

Figure 5:
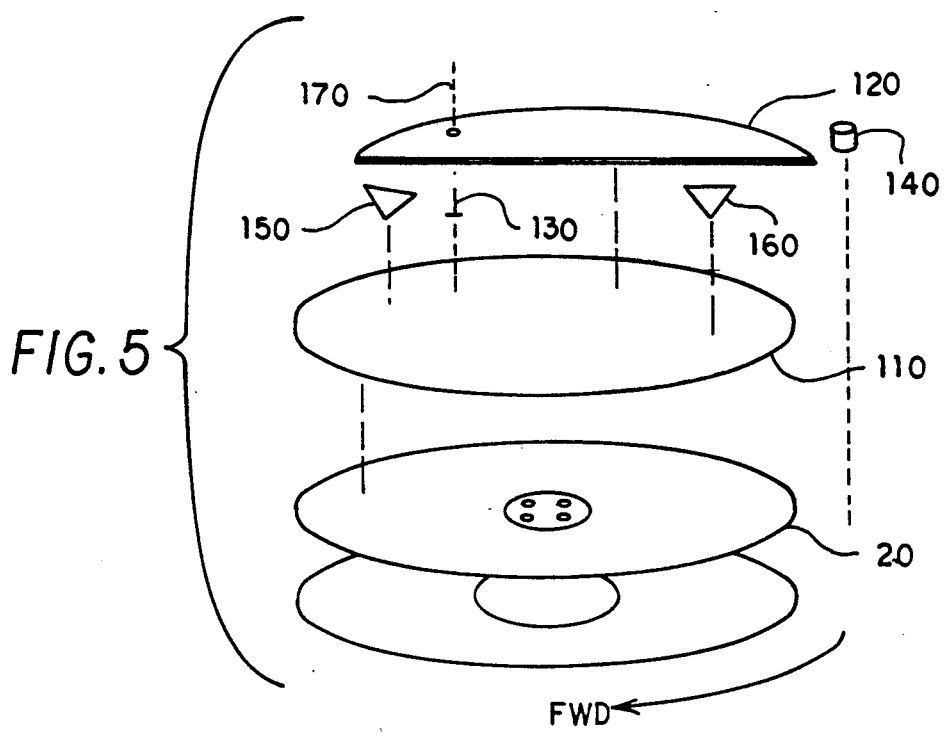
FIG. 5 is an exploded view of the elements in FIG. 4.

The exploded view of FIG. 5 is provided primarily to show the relationship between mounting plate 110 and tape spool 120 as well as a schematic representation of spring means 170.

Figure 7:
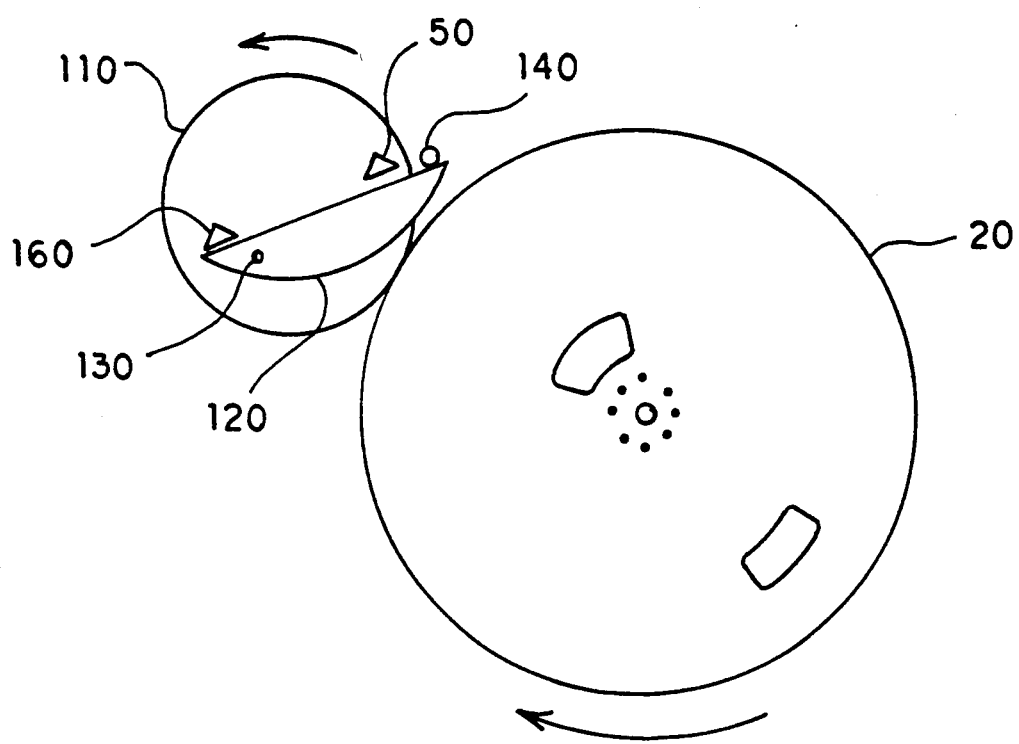
FIG. 7 is a top view of a third embodiment of the invention.

A variant of the second embodiment is shown in FIG. 7. In this variation it can be seen that circular mounting plate 110 and its associated mechanisms need not necessarily be directly mounted on a face of tape spool 20 nor be the same diameter as the spool. A smaller version offset radially from tape spool 20 would serve the same purpose if the mounting plate 10 were forced to rotate along with the tape spool. The embodiment of FIG. 7 shows this being accomplished by direct circumferential contact between the circular mounting plate 10 and tape spool 20.

It is to be understood that the present invention is not limited to the embodiments described above, but encompasses any and all embodiments within the scope of the following claims.

In particular, there are many types of clutch which would be suitable for the present invention. Any clutch whose transmitted torque limit is a proper function of rotation speed would be suitable. One type is a centrifugal clutch, whose torque decreases in proportion to speed. Other types may have abrupt creases in proportion to speed. Other types may have abrupt cutoff of torque transmittal beyond a certain number of revolutions per minute.

Combinations of two or more types of clutch in series or parallel are not to be ruled out. ("Series" or "parallel" refer to the force path from input to output.) These might be called subclutches. Combinations of subclutches could yield various functions of torque versus speed.

There are also clutches whose torque transmittal is a function of the difference of speed of the input and output shaft, rather than of absolute rotation of the input shaft. One example is the magnetic induction clutch often found in automobile speedometers, which transmits torque in proportion to the speed of the input shaft versus the stationary output housing. Clutches of this type could also be used in the instant invention.

By proper clutch selection and design, the function of the cassette could even be altered (without changing the inventive concept) to run the tape at play speed (rather than stopping the tape) when the fast forward of the recorder were engaged.

I claim:

1. A cassette having an opening therein for receiving a drive capstan, said cassette containing a reel having a cylindrical sleeve and a linear element joined to said cylindrical sleeve, said linear element adapted to hold information, said cassette including:
   means for preventing motion of said linear element at speeds higher than normal playback speed, said means including:
   a clutch positioned at the center of said reel and including:
   a spindle positioned above said opening and within said cylindrical sleeve, said spindle being rotatably joined to said cylindrical sleeve and for receiving a drive capstan when intruded through said opening,
   a drive stud fixedly joined to said cylindrical sleeve and extending inwardly toward said spindle, and
   an arm pivotally joined to said spindle for engaging said drive stud.

2. The cassette according to claim 1 wherein said spindle includes a stop pin extending therefrom adjacent said swinging arm for retaining said swinging arm in a generally vertical orientation when said spindle is rotated in a reverse direction.

3. A cassette as in claim 2 wherein said linear element is magnetic tape.

4. A cassette of the type having
   a housing,
   a reel disposed within said housing,
   an information storage tape having two ends, one of said ends fixed to said reel, and
   an opening through said housing adjacent said reel, said opening adapted to accept therethrough a capstan, whereby said capstan may intrude through said openings to engage said reel,
   wherein said improvement comprises:
   a clutch positioned at the center of said reel including:
   a spindle positioned above said opening and pivotally joined to said reel for receiving the drive capstan when intruded through said opening,
   a cylindrical sleeve positioned about said spindle and fixedly joined to said reel,
   a drive stud fixedly joined to said cylindrical sleeve and extending inwardly toward said spindle, and
   a swinging arm pivotally joined to said spindle for engaging said drive stud,
   said clutch adapted to prevent relative rotation of said reel and said capstan in a forward direction at low rotational speeds,
   said clutch further adapted to allow relative rotation of said reel and said capstan in a forward direction at high rotational speeds.

5. The cassette as described in claim 4 wherein:
   said spindle includes a stop pin extending therefrom adjacent said swinging arm for retaining said swinging arm in a generally vertical orientation when said spindle is rotated in a reverse direction.

6. A cassette of the type having:
   a housing,
   two reels disposed within said housing, said reels each including means to engage one of a plurality of capstans for rotational driving by said capstan,
   an information storage tape having two ends, one of said ends fixed to one of said reels and the other one of said ends attached to the other said reel for wrapping said tape around said reels, and
   openings through said housing adjacent said reels, said openings adapted to accept therethrough said capstans, whereby said capstans may intrude through said openings to engage said means for rotational driving of said reels,
   wherein the improvement comprises:
   centrifugal means engaging one of said reels so as to rotate therewith and, above a predetermined angular velocity engaging a fixed catch pin for effectively preventing further rotation of said engaged reel, said centrifugal means including an arcuate wedge arm pivotally joined to a circular mounting plate in contact with said engaged reel.

7. The improved cassette of claim 6 wherein said centrifugal means is rigidly mounted on one of said reels.

8. The improved cassette of claim 7 wherein said centrifugal means is mounted adjacent one of said reels but still constrained to rotate therewith.

* * * * *